(12) United States Patent
Mawhinney et al.

(10) Patent No.: US 12,603,554 B2
(45) Date of Patent: Apr. 14, 2026

(54) SYSTEMS, ASSEMBLIES, AND METHODS ASSOCIATED WITH A REPLACEABLE MOTOR CONTROLLER

(71) Applicant: Precision Engine Controls Corporation, San Diego, CA (US)

(72) Inventors: Joel T. Mawhinney, San Diego, CA (US); Robert J. Hingle, San Diego, CA (US)

(73) Assignee: Precision Engine Controls Corporation, San Diego, CA (US)

( * ) Notice: Subject to any disclaimer, the term of this patent is extended or adjusted under 35 U.S.C. 154(b) by 302 days.

(21) Appl. No.: 18/591,279

(22) Filed: Feb. 29, 2024

(65) Prior Publication Data

US 2024/0413715 A1      Dec. 12, 2024

Related U.S. Application Data

(60) Provisional application No. 63/506,408, filed on Jun. 6, 2023.

(51) Int. Cl.
H02K 15/50 (2025.01)
H02K 11/33 (2016.01)

(52) U.S. Cl.
CPC ............. H02K 15/50 (2025.01); H02K 11/33 (2016.01); H02K 2215/00 (2021.08)

(58) Field of Classification Search
CPC ........ H02K 7/116; H02K 11/21; H02K 11/33; H02K 15/50
See application file for complete search history.

(56) References Cited

U.S. PATENT DOCUMENTS

| | | | |
|---|---|---|---|
| 7,254,463 B1 | 8/2007 | Moore | |
| 2013/0129538 A1 | 5/2013 | Bantz et al. | |
| 2015/0002002 A1* | 1/2015 | Monster ................. | H02K 11/30 |
| | | | 310/68 R |
| 2021/0152058 A1* | 5/2021 | Modi ..................... | H02K 11/28 |
| 2022/0267015 A1 | 8/2022 | Vermieren | |

FOREIGN PATENT DOCUMENTS

CN          109991905 A          7/2019

OTHER PUBLICATIONS

35136C Woodward GS Series Gas Valve, Installation and Operation Manual, Product Manual 35136, Revision C, retrieved from www.woodward.com, Aug. 2021.

* cited by examiner

*Primary Examiner* — Leda T Pham
(74) *Attorney, Agent, or Firm* — McDonnell Boehnen Hulbert & Berghoff LLP

(57)          ABSTRACT

An example system includes: an electric motor; a mechanical device coupled to, and actuatable by, the electric motor; and an electronics module comprising: (i) a motor controller controlling the electric motor, and (ii) an actuator board that is electrically coupled to the motor controller, wherein the motor controller is removable and replaceable, wherein the actuator board remains attached to the system when the motor controller is removed and replaced, wherein the actuator board comprises (i) a memory storing one or more settings associated with the electric motor, or (ii) an identifier, wherein when a replacement motor controller is electrically connected to the actuator board, the replacement motor controller receives the one or more settings from the memory of the actuator board or receives the identifier, which allows the motor controller to retrieve the one or more settings.

20 Claims, 8 Drawing Sheets

600

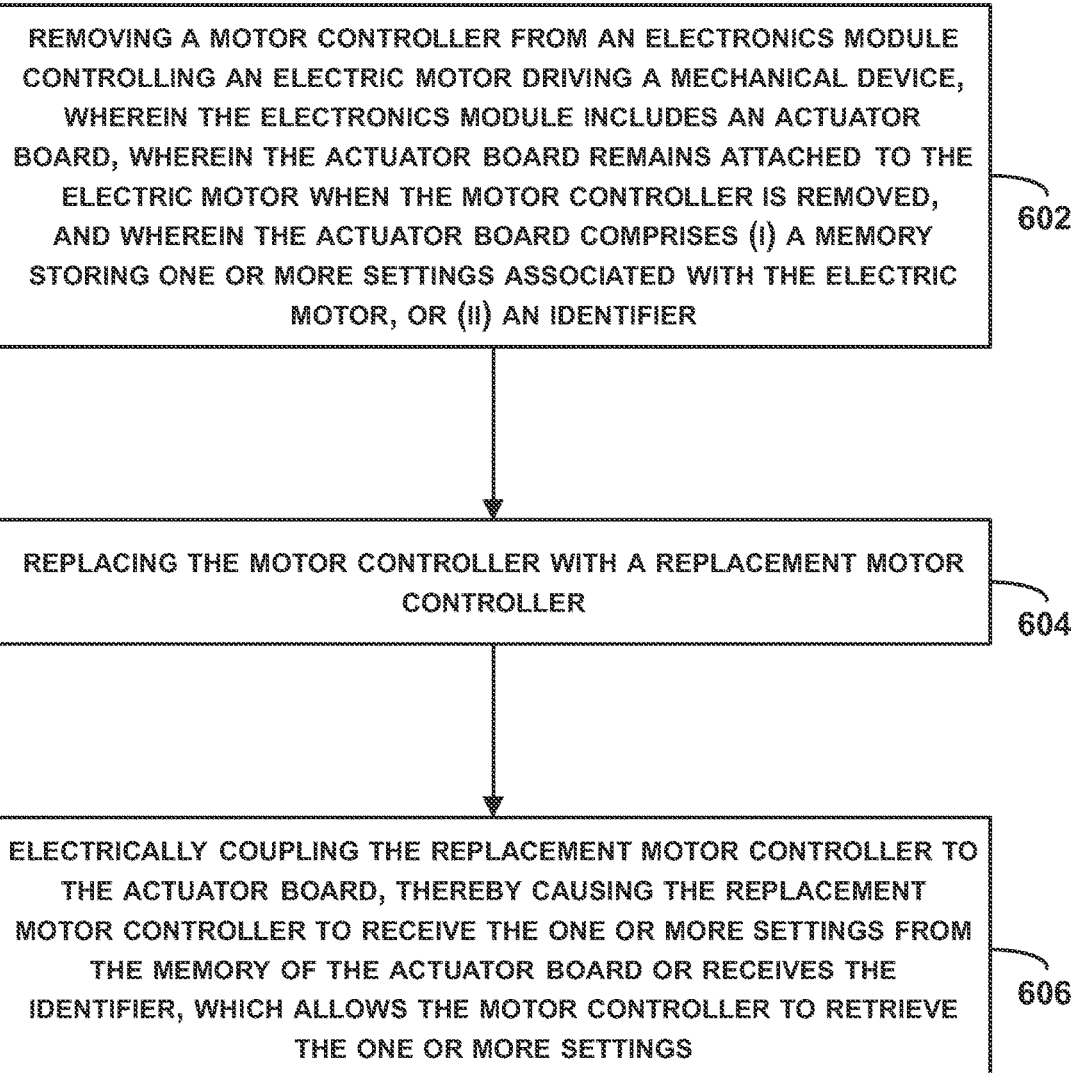

REMOVING A MOTOR CONTROLLER FROM AN ELECTRONICS MODULE CONTROLLING AN ELECTRIC MOTOR DRIVING A MECHANICAL DEVICE, WHEREIN THE ELECTRONICS MODULE INCLUDES AN ACTUATOR BOARD, WHEREIN THE ACTUATOR BOARD REMAINS ATTACHED TO THE ELECTRIC MOTOR WHEN THE MOTOR CONTROLLER IS REMOVED, AND WHEREIN THE ACTUATOR BOARD COMPRISES (I) A MEMORY STORING ONE OR MORE SETTINGS ASSOCIATED WITH THE ELECTRIC MOTOR, OR (II) AN IDENTIFIER

602

REPLACING THE MOTOR CONTROLLER WITH A REPLACEMENT MOTOR CONTROLLER

604

ELECTRICALLY COUPLING THE REPLACEMENT MOTOR CONTROLLER TO THE ACTUATOR BOARD, THEREBY CAUSING THE REPLACEMENT MOTOR CONTROLLER TO RECEIVE THE ONE OR MORE SETTINGS FROM THE MEMORY OF THE ACTUATOR BOARD OR RECEIVES THE IDENTIFIER, WHICH ALLOWS THE MOTOR CONTROLLER TO RETRIEVE THE ONE OR MORE SETTINGS

SYSTEMS, ASSEMBLIES, AND METHODS ASSOCIATED WITH A REPLACEABLE MOTOR CONTROLLER

CROSS REFERENCE TO RELATED APPLICATION

The present application claims priority to U.S. Provisional Patent Application No. 63/506,408 filed on Jun. 6, 2023, the entire contents of which are herein incorporated by reference as if fully set forth in this description.

BACKGROUND

A motor-controlled system typically includes of a motor controller, motor (or actuator) assembly, and a controlled apparatus such as a valve or pump. The motor controller of these systems is often configured for the installation to control parameters such as the distance of travel of an actuator, speed of motion, maximum torque, fault sensing conditions for the system, etc.

In some cases, these motor controllers may need to be replaced (e.g., due to failure of a component, circuit, malfunction, etc.), but the mechanical system may still be functional or serviceable. Replacing the motor controller with a new motor controller may involve using a computer to configure the settings of the motor controller for the system to operate as expected (e.g., as it has been operating with the motor controller being replaced).

However, configuring a motor controller in the field may lead to misconfiguration and system malfunction. Alternatively, motor controllers can be preconfigured at a factory, but this approach might necessitate that an operator stock many controllers with different settings for different systems that the operator may be using. This approach is costly due to the level of inventory that the operator might need to maintain.

It is with respect to these and other considerations that the disclosure made herein is presented.

SUMMARY

The present disclosure describes implementations that relate to systems, assemblies, and methods associated with a replaceable motor controller.

In a first example implementation, the present disclosure describes a system. The system includes: a mechanical system including an electric motor and a mechanical device coupled to, and actuatable by, the electric motor; and an electronics module comprising: (i) a motor controller controlling the electric motor, and (ii) an actuator board (e.g., a printed circuit board acting as electrical interface) that is electrically coupled to the motor controller and the mechanical system, wherein the motor controller is removable and replaceable, wherein the actuator board remains attached to the mechanical system when the motor controller is removed and replaced, wherein the actuator board comprises (i) a memory storing one or more settings associated with the electric motor, or (ii) an identifier, wherein when a replacement motor controller is electrically connected to the actuator board, the replacement motor controller receives the one or more settings from the memory of the actuator board or receives the identifier, which allows the motor controller to retrieve the one or more settings.

In a second example implementation, the present disclosure describes a method. The method includes: removing a motor controller from a mechanical system driving a mechanical device, wherein the mechanical system includes an actuator board, wherein the actuator board remains attached to the mechanical system when the motor controller is removed, and wherein the actuator board comprises (i) a memory storing one or more settings associated with the electric motor, or (ii) an identifier; replacing the motor controller with a replacement motor controller; and electrically coupling the replacement motor controller to the actuator board, thereby causing the replacement motor controller to receive the one or more settings from the memory of the actuator board or receives the identifier, which allows the motor controller to retrieve the one or more settings.

The foregoing summary is illustrative only and is not intended to be in any way limiting. In addition to the illustrative aspects, implementations, and features described above, further aspects, implementations, and features will become apparent by reference to the figures and the following detailed description.

BRIEF DESCRIPTION OF THE FIGURES

FIG. 6 is a flowchart of a method associated with replacement of a motor controller, in accordance with an example implementation.

DETAILED DESCRIPTION

Disclosed herein are systems, assemblies, and methods allowing an operator of a motor controlled system to replace a motor controller with no special technical knowledge of the controls and without the need to configure the motor controller with parameters suitable for the particular mechanical system being controlled. The disclosed systems, assemblies, and methods may thus lead to avoiding setup errors and reducing maintenance time. They may also save cost as they lead to stocking of fewer spare modular motor controllers due to compatibility with an entire family of motor-actuated systems.

Within examples, a disclosed configuration involves having an actuator board that is attached to the mechanical assembly and is not removable with a replaceable motor controller. In an example, the actuator board includes a memory that stores configurable operation settings of the electric motor that are suitable for the particular mechanical apparatus being controlled (e.g., pump or valve). Examples of such configurable operation settings include distance of travel (stroke), speed of motion, maximum torque, fault sensing conditions, mechanical and sensor calibration data, etc. In another example, the actuator board may include an identifier that indicates which settings should be used for the particular electric motor and mechanical apparatus.

In these examples, the motor controller is configured to be plugged into the actuator board when. When the motor controller is removed and replaced by a new or replacement motor controller, the actuator board remains attached to the mechanical assembly of the electric motor and mechanical apparatus. This way, when the replacement motor controller is plugged into the actuator board, it receives the settings from the memory of the actuator board, or receives the identifier that enables the motor controller to retrieve the settings associated with the particular electric motor and particular mechanical device. As such, the same motor controller can be used with a variety of mechanical system without having to perform field configuration.

Figure 1:
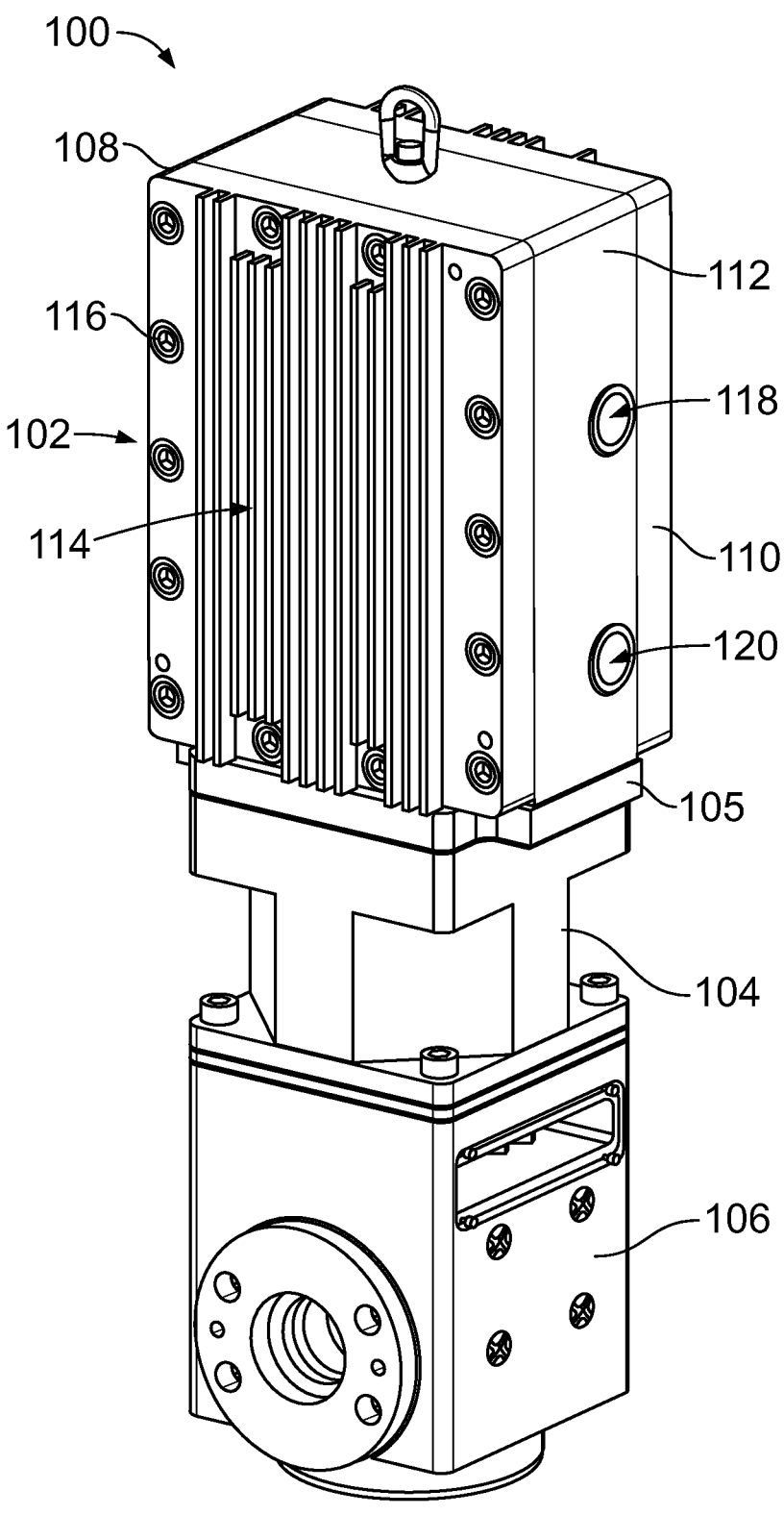
FIG. 1 illustrates a perspective view of a system, in accordance with an example implementation.

FIG. 1 illustrates a perspective view of a system 100, in accordance with an example implementation. The assembly includes an electronics module 102, an actuator assembly or an assembly of an electric motor 104, and a mechanical device 106. The mechanical device 106 can include a valve (e.g., a ball valve), a pump, a linear actuator, etc. and is actuated by the electric motor 104.

As depicted, the electronics module 102 is mounted to the electric motor 104 via an adapter 105. The electric motor 104 in turn is coupled to the mechanical device 106 to drive a movable element of the mechanical device 106. This implementation is an example for illustration. In other example implementations, the electronics module 102 can be mounted remotely and connected to the electric motor 104 via cables.

The electric motor 104 can be any type of electric motor (e.g., permanent magnet motor, a switch reluctance motor, a flux switching motor, an induction motor, etc.). For example, the electric motor 104 can include a stator fixedly disposed within a housing of the electric motor 104. The stator can include a lamination stack. The stator may also include wire windings wrapped about the lamination stack. When electric current is provided through the wire windings of the stator, a magnetic field is generated.

The stator may have an annular space therein, and the electric motor 104 can further include a rotor disposed in the annular space of the stator. The electric motor 104 may include a plurality of magnets that can be mounted to, and disposed in a circular or circumferential array about, an exterior surface of the rotor. The magnets may be configured to interact with the magnetic field generated by the windings of the stator to rotate the rotor and produce torque to drive the mechanical device 106.

The electronics module 102 is configured to control the electric motor 104. For instance, the electronics module 102 can include a controller and an inverter. The inverter can be configured as a power converter that converts direct current (DC) power received at the inverter (e.g., received from a battery or electric generator) to three-phase, alternating current (AC) power that can be provided to wire windings of a stator of the electric motor 104 to drive the electric motor 104. The controller may have a microprocessor that provides a pulse width modulated (PWM) signal to operate the three phases of the electric motor 104, for example.

In an example, as depicted, the electronics module 102 can include a first cover 108, a second cover 110, and a chassis 112 interposed between the first cover 108 and the second cover 110. With this configuration, the first cover 108, the chassis 112, and the second cover 110 form an enclosure that houses electronic components, boards, etc. of the electronics module 102.

As described in more details below with respect to FIGS. 3A-3B, a motor controller can be mounted to the first cover 108, extending inside the chassis 112. The first cover 108 may therefore be configured to have fins 114 that facilitate air cooling of the motor controller, which generates heat during operation.

The first cover 108 is attached to the chassis 112 via fasteners, such as fastener 116. The first cover 108 can be removed from the chassis 112 to allow the motor controller attached thereto to be removed and replaced with a replacement motor controller.

The second cover 110 is configured as an access cover. Particularly, when a replacement motor controller is installed, the second cover 110 can be removed to allow an operator to have access to the motor controller mounted to the first cover 108. The operator can then make wires connections between external wires provided through hole 118 and hole 120 in the chassis 112 and terminals of connectors of the motor controller (see connectors of motor controller 200 shown in FIGS. 3A-3B).

Figure 2:
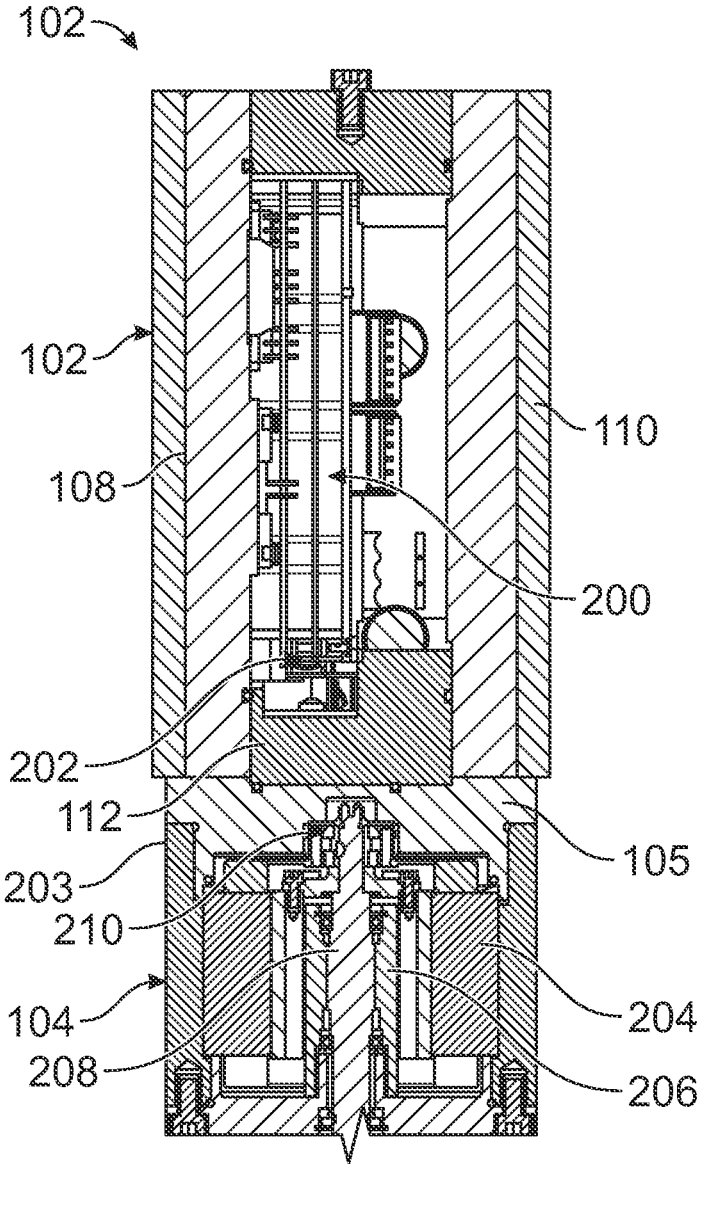
FIG. 2 illustrates a partial cross-sectional view of an electronics module and an electric motor of the system of FIG. 1, in accordance with an example implementation.

FIG. 2 illustrates a partial cross-sectional view of the electronics module 102 and the electric motor of the system 100, in accordance with an example implementation. Particularly, FIG. 2 depicts the electronics module 102 and the electric motor 104, but does not show the mechanical device 106 to reduce visual clutter in the drawing.

The electronics module 102 includes a motor controller 200 that is mounted to an internal surface of the first cover 108 and extends into the enclosure within the chassis 112. As described below, the motor controller 200 can include printed circuit boards, integrated circuits or chips, etc. The first cover 108 is removable, and the motor controller 200 is replaceable.

The electronics module 102 further includes an actuator board 202 that is mounted to the chassis 112. The actuator board 202 is affixed to the chassis 112 and remains with the chassis 112 when the first cover 108 is removed and the motor controller 200 is replaced.

In the example implementation of FIG. 2, the actuator board 202 is perpendicular to the motor controller 200. However, in other example implementations, other orientations can be used. When the motor controller 200 is mounted to the first cover 108, and the first cover 108 is mounted to the chassis 112, the motor controller 200 "plugs" into the actuator board 202 to be mechanically and electrically coupled to the actuator board 202.

The electric motor 104 can include a housing 203, a stator 204 fixedly disposed within the housing 203, a rotor 206 rotatably mounted within the stator 204, and an output shaft 208 coupled to (and rotatable with) the rotor 206. The output shaft 208 is configured to be coupled to a movable element of the mechanical device 106 to actuate the mechanical device 106 as the rotor 206 rotates.

In an example, the electric motor 104 can further include a resolver 210. The resolver 210 can be an electromechanical sensor configured to determine the angular position and speed of the output shaft 208.

Figure 3A:
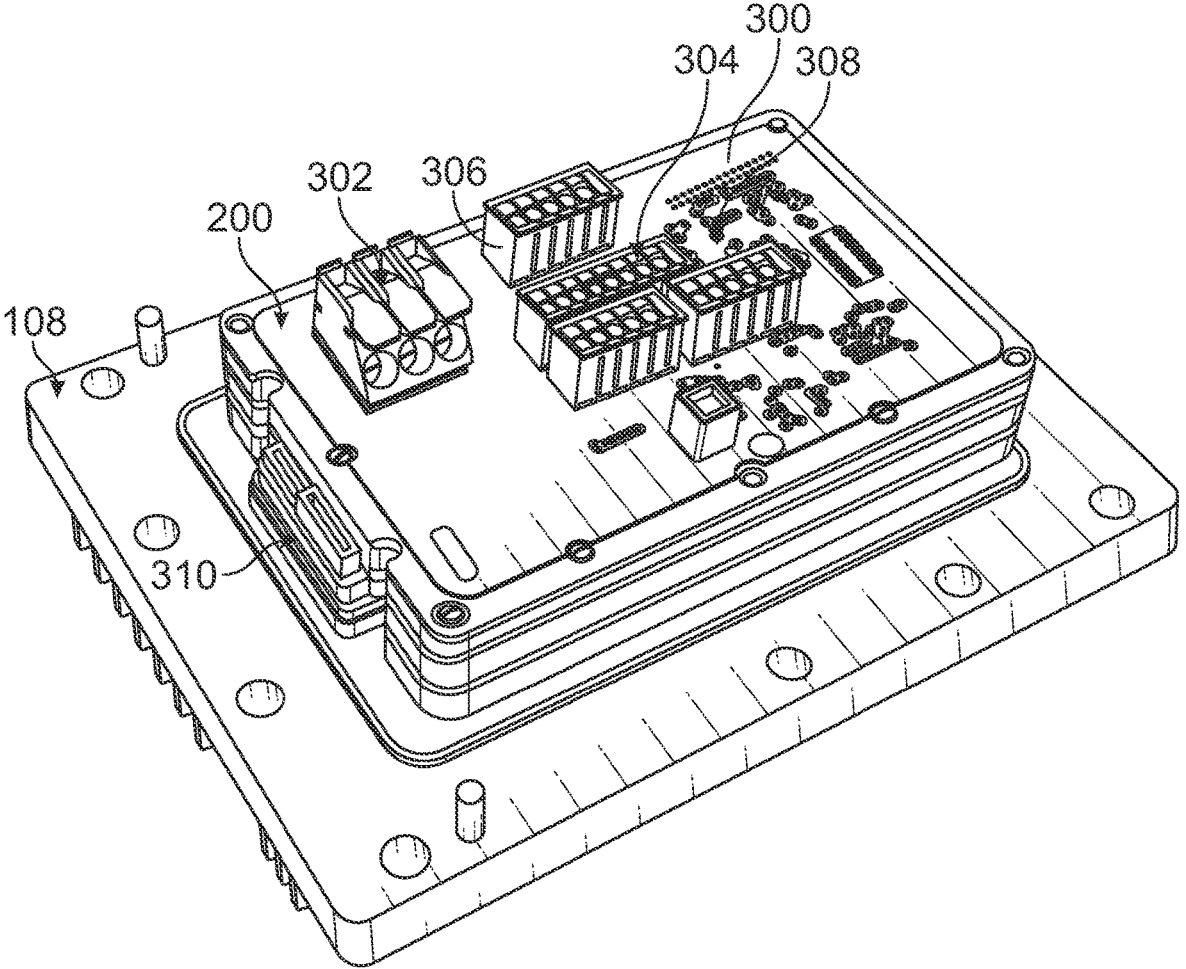
FIG. 3A illustrates a perspective view of a first cover with a motor controller mounted thereto, in accordance with an example implementation.
Figure 3B:
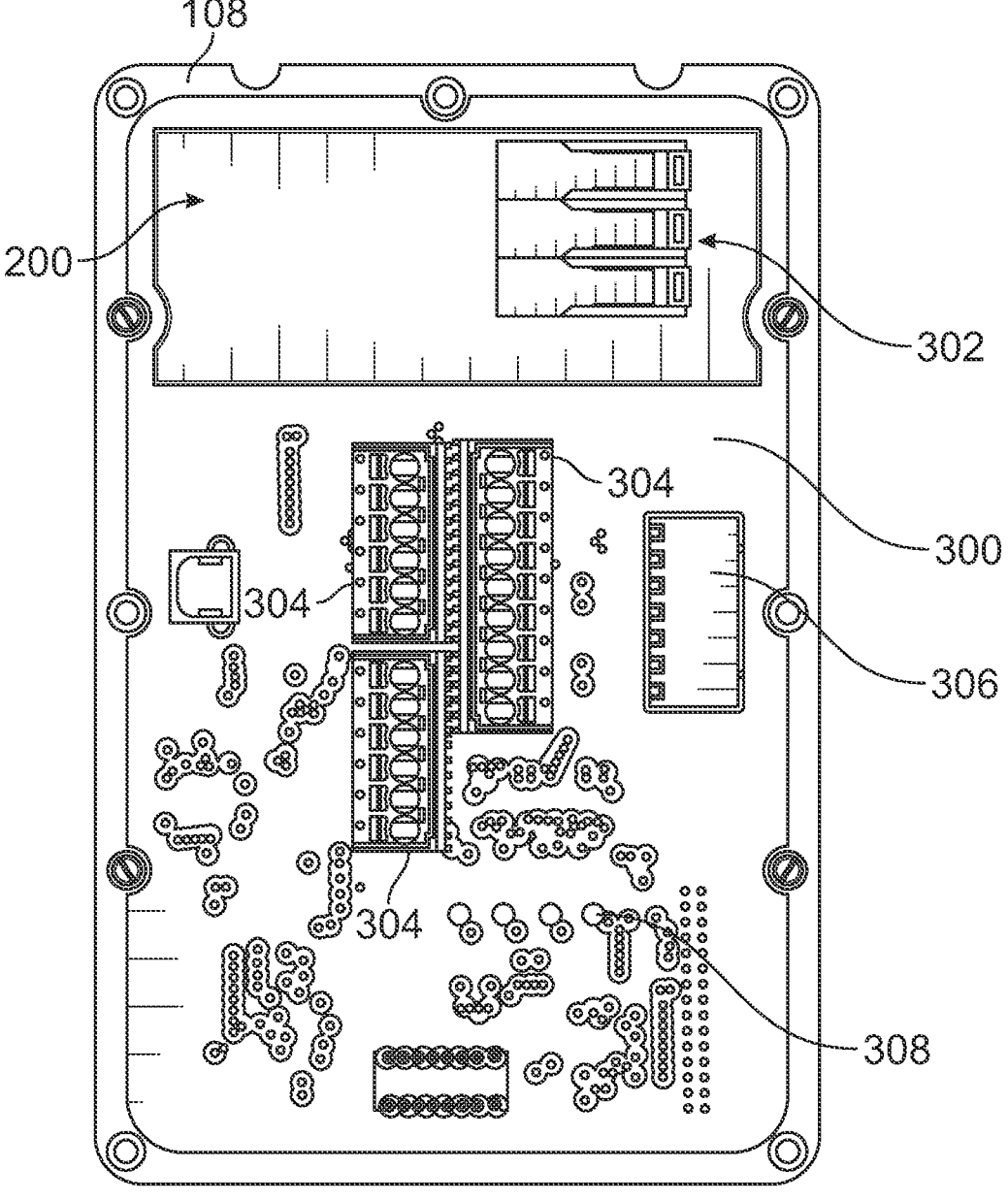
FIG. 3B illustrates a front view of the first cover with the motor controller mounted thereto, in accordance with an example implementation.

FIG. 3A illustrates a perspective view of the first cover 108 with the motor controller 200 mounted thereto, and FIG. 3B illustrates a front view of the first cover 108 with the motor controller 200 mounted thereto, in accordance with an example implementation. FIGS. 3A-3B are described together.

The motor controller 200 can include one or more printed circuit boards (PCBs), such as PCB 300. A PCB mechanically supports and electrically connects electronic components (e.g., microprocessors, integrated chips, capacitors, resistors, etc.) using conductive tracks, pads, and other features etched from one or more sheet layers of copper laminate onto and/or between sheet layers of a nonconductive substrate. Components are generally soldered onto the PCB 300 to both electrically connect and mechanically fasten them to it.

The motor controller 200 includes power input terminals 302 mounted to the PCB 300. An operator can connect power wires from an external source (e.g., a battery or power generator) to the power input terminals 302. The motor controller 200 can have chips or microprocessors that use the input power provided to the power input terminals 302 to generate electric signals for the wire windings of the stator 204 of the electric motor 104.

The motor controller 200 can also include control and monitoring signal terminals 304 mounted to the PCB 300. An operator can connect wires between the motor controller 200 and an external controller via the control and monitoring signal terminals 304. Such wires can communicate signals between the motor controller 200 and the external controller, where the signals can include analog and digital signals, enable, reset, fault outputs, position command from the external controller to the motor controller 200, feedback from the motor controller 200 to the external controller indicating how much force/torque is applied by the electric motor 104, position feedback from the motor controller 200 to the external controller indicating rotary position of the output shaft 208 or a position of a movable element of the mechanical device 106, etc.

The motor controller 200 can further include serial interface terminals 306 that facilitate communication with external devices via a serial bus communication, for example. This communication may be used for control (position, velocity, or torque command, enable, reset) and/or monitoring of the electric motor 104 (position, velocity, force output, voltages, temperatures, etc.) by an external controller, for example.

The motor controller 200 can further include other components mounted to the PCB 300. For instance, the PCB 300 can include status indicators 308 (e.g., light emitting diodes). The status indicators 308 can provide visual indications of whether power is being provided to the PCB 300, whether a fault occurred, etc.

As shown in FIG. 3A, the motor controller 200 can also include one or more connectors 310 that plug into corresponding connectors of the actuator board 202 when the first cover 108 is mounted to the chassis 112.

Figures 4A, 4B:
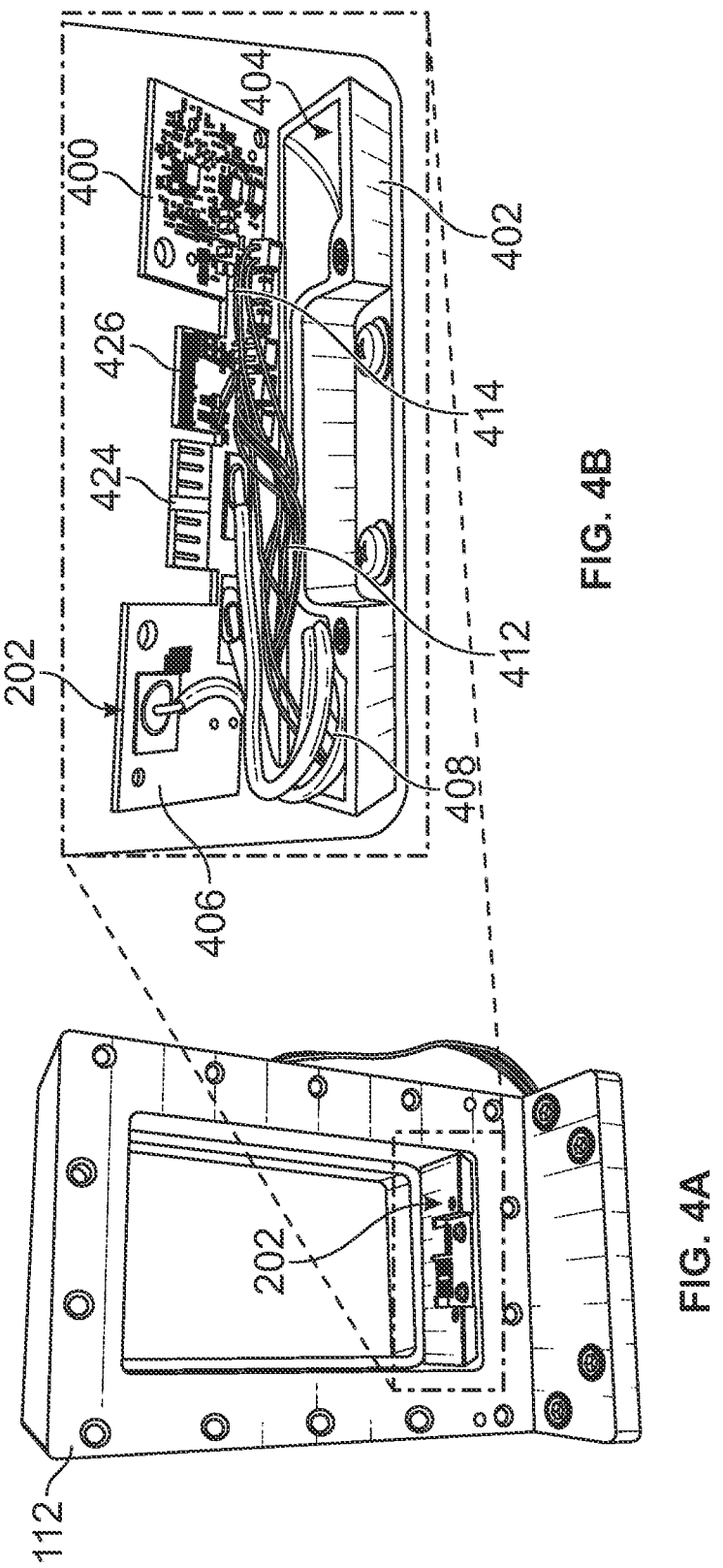
FIG. 4A illustrates a perspective view of an actuator board mounted to a chassis, in accordance with an example implementation.
FIG. 4B illustrates a close-up view of the actuator board of FIG. 4A, in accordance with an example implementation.
Figure 4C:
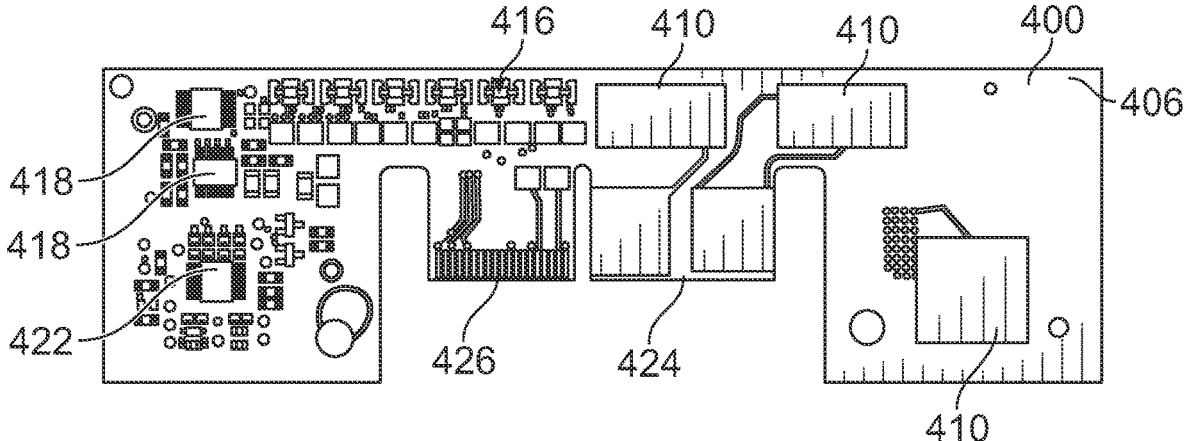
FIG. 4C illustrates a bottom view of the actuator board of FIGS. 4A-4B, in accordance with an example implementation.

FIG. 4A illustrates a perspective view of the actuator board 202 mounted to the chassis 112, FIG. 4B illustrates a close-up view of the actuator board 202, and FIG. 4C illustrates a bottom view of the actuator board 202, in accordance with an example implementation. In FIG. 4B, the actuator board 202 is lifted to reveal wire connections and components coupled to a bottom surface of the actuator board 202. However, it should be understood that in operation, the actuator board 202 affixed to the chassis 112 as shown in FIG. 4A.

As shown in FIG. 4A, the chassis 112 can be formed generally as a rectangular prism with a chamber formed therein. The actuator board 202 is attached to the internal bottom portion of the chassis 112. The actuator board 202 is configured to remain with the chassis 112 and the mechanical device 106 when the first cover 108 is removed and the motor controller 200 is replaced.

Referring to FIG. 4B, the actuator board 202 has a PCB 400. The chassis 112 can include a housing 402 (e.g., a plastic housing) coupled to the bottom portion of the chassis 112, and the housing 402 forms a compartment 404 (e.g., empty space) that accommodates the wiring and components attached to a bottom surface 406 of the PCB 400 of the actuator board 202.

For example, referring to FIGS. 4B-4C together, motor wires 408 (e.g., wires connected to wire windings of the stator 204) are connected to motor wire terminals 410 attached to the bottom surface 406 of the PCB 400. Resolver wires 412 and temperature sensor wires 414 are connected to thermal and resolver terminals 416 mounted to the PCB 400.

The actuator board 202 can include several other components as desired and depending on the application in which the electronics module 102 and the electric motor 104 are used. For example, the actuator board 202 can include one or more memories such as memory 418 (e.g., a non-volatile memory). The memory 418 can store all the configurable operation settings (rotational stroke, speed, maximum torque, fault sensing conditions, etc.) of the electric motor 104 that are suitable for a particular mechanical device in a particular application.

In an example, the actuator board 202 can further include a chip 422 that operates as a motor temperature analog to digital converter. Notably, when the actuator board 202 is affixed to the housing 402, the components of the actuator board 202 and the wires connected to the actuator board 202 are stowed or encapsulated within the compartment 404 of the housing 402 for protection.

Further, the actuator board 202 can include one or more respective connectors (e.g., edge connectors) that the connectors 310 plug into when the first cover 108 and the motor controller 200 mounted thereto is coupled to the chassis 112. For example, the actuator board 202 can include a motor interface connector 424 and a signal interface connector 426. The motor interface connector 424 and the signal interface connector 426 are electrically connected (e.g., via conductive traces of the PCB 400) to various terminals and components of the actuator board 202. When motor controller 200 plugs into the actuator board 202, the connectors 310 plug into the motor interface connector 424 and the signal interface connector 426.

The motor interface connector 424 can three phase AC signals, for example, from the motor controller 200 to the motor wire terminals 410, then to the motor wires 408, which are connected to the wire windings of the stator 204. The signal interface connector 426 can communicate various sensor signals (e.g., from the resolver 210, temperature sensors such as thermistors shown in FIG. 5, etc.) to the motor controller 200.

Figure 5:
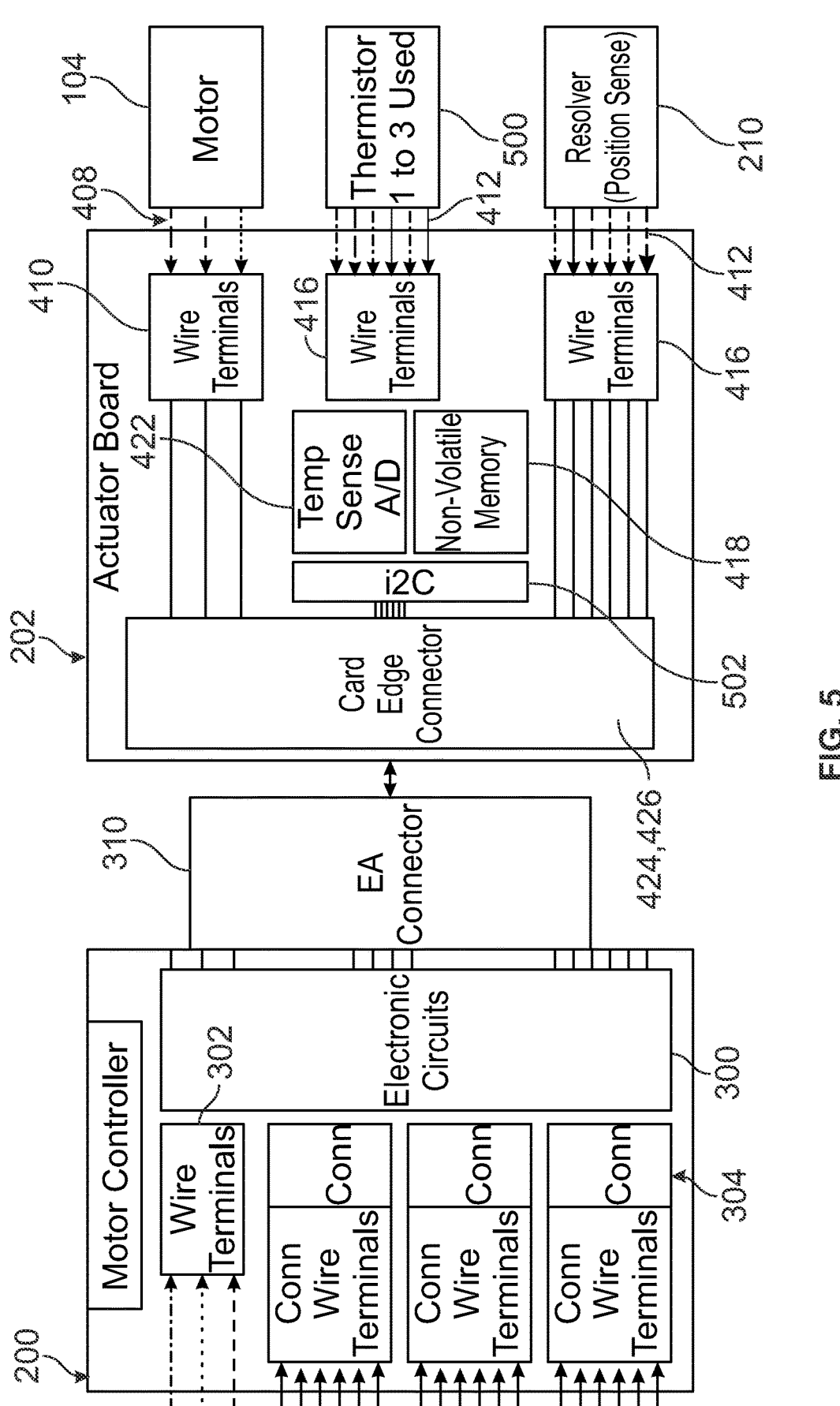
FIG. 5 illustrates is a block diagram of a motor controller and an actuator board, in accordance with an example implementation.

FIG. 5 is a block diagram of the motor controller 200 and the actuator board 202, in accordance with an example implementation. FIG. 5 depicts the electric motor 104 with one or more thermistors 500 (e.g., temperature sensors) and the resolver 210 communicating with respective terminals of the actuator board 202.

The actuator board 202 includes various terminals, the chip 422 (motor temperature analog to digital converter), the memory 418, and may also include a serial communication data bus 502. In an example, the serial communication data bus 502 can include an Inter-Integrated Circuit (i2C) that implements a communication protocol that facilitates communication between different components of the actuator board 202. The protocol may involve a serial communication protocol that enables communication between two or more devices, using two wires, (e.g., Serial Data Serial Clock lines).

The serial communication data bus 502 can thus be used to connect different components on the PCB 400, such as microcontrollers, sensors, memory chips, and other peripheral devices. It allows these components to communicate with each other, exchange data, and work together to perform specific functions. For example, the serial communication data bus 502 can control and monitor sensor data, reading and writing data to memory chips (e.g., the memory 418), etc.

When the connectors 310 of the motor controller 200 are plugged into the motor interface connector 424 and the signal interface connector 426 of the actuator board 202, the motor controller 200 gains access to the settings of the electric motor 104 that are tuned to the mechanical device 106. The settings can be stored in the memory 418, for example.

In another example, the memory 418 can include an identifier (e.g., a numeric or alphanumeric code). The motor controller 200 may have a database stored on a memory thereof, and the database can index or associate various identifiers with corresponding sets of motor settings. When the motor controller 200 receives the identifier from the actuator board 202, the motor controller 200 retrieves from the database the settings corresponding to the identifier. The motor controller 200 can receive the settings or the identifier electrically or via a communication link, for example.

In another example, the actuator board 202 can include jumpers that are configured in a particular way to form a binary code that operates as the identifier. Jumpers on the PCB 400 can, for example, be small connectors that can be used to modify the electrical connections between different parts of the circuit.

In an example, jumpers are made of two metal pins or pads, which are connected by a small metal bridge. By default, the bridge is in place, connecting the two pins or pads. However, the bridge can be removed, or "jumped," to break the connection between the two pins or pads. Thus, by placing several jumpers in a particular configuration, they can be used configure or customize the identifier associated with the electric motor 104 and the mechanical device 106. When the motor controller 200 is plugged into the actuator board 202, the motor controller 200 "reads" the jumper configuration (e.g., as a binary code) that is then used to retrieve the settings from the database. For example, the PCB 300 of the motor controller 200 may contact the jumpers to determine their configuration and determine the identifier.

Whether the motor controller 200 receives the settings from the memory 418 of the actuator board 202, or receives an identifier from the actuator board 202 that is then use to retrieve the settings of the electric motor 104 and the mechanical device 106, the motor controller 200 does not need to be configured, preset, or tuned when installed. Rather, the disclosed system allows for a "plug-and-play" configuration where, as the motor controller 200 is plugged into the actuator board 202, it gains access to the settings of the electric motor 104 and the particular application. Thus, a module motor controller can be stored and used with various electric motors in various applications without having to tune the motor controller.

The actuator board 202 remains with the mechanical assembly (e.g., the assembly of the electric motor 104 with the mechanical device 106). Thus, there is no need to re-tune a replacement motor controller each time the motor controller 200 is replaced.

FIG. 6 is a flowchart of a method 600 associated with replacement of a motor controller, in accordance with an example implementation. The method 600 may include one or more operations, functions, or actions as illustrated by one or more of steps 602-606.

Although the steps are illustrated in a sequential order, these steps may also be performed in parallel, and/or in a different order than those described herein. Also, the various steps may be combined into fewer steps, divided into additional steps, and/or removed based upon the desired implementation. It should be understood that for this and other processes and methods disclosed herein, flowcharts show functionality and operation of one possible implementation of present examples. Alternative implementations are included within the scope of the examples of the present disclosure in which functions may be executed out of order from that shown or discussed, including substantially concurrent or in reverse order, depending on the functionality involved, as would be understood by those reasonably skilled in the art.

At block 602, the method 600 includes removing a motor controller (e.g., the motor controller 200) from the electronics module 102 controlling the electric motor 104 driving the mechanical device 106, wherein the electronics module 102 includes the actuator board 202, wherein the actuator board 202 remains attached to the electric motor 104 (or to the electronics module 102, which is attached to the electric motor 104) when the motor controller is removed, and wherein the actuator board 202 comprises (i) a memory (e.g., the memory 418) storing one or more settings associated with the electric motor 104, or (ii) an identifier.

At block 604, the method 600 includes replacing the motor controller with a replacement motor controller.

At block 606, the method 600 includes electrically coupling the replacement motor controller to the actuator board 202, thereby causing the replacement motor controller to receive the one or more settings from the memory of the actuator board or receive the identifier, which allows the motor controller to retrieve the one or more settings.

The method 600 can further include other steps to as described throughout herein.

The detailed description above describes various features and operations of the disclosed systems with reference to the accompanying figures. The illustrative implementations described herein are not meant to be limiting. Certain aspects of the disclosed systems can be arranged and combined in a wide variety of different configurations, all of which are contemplated herein.

Further, unless context suggests otherwise, the features illustrated in each of the figures may be used in combination with one another. Thus, the figures should be generally viewed as component aspects of one or more overall implementations, with the understanding that not all illustrated features are necessary for each implementation.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

Further, devices or systems may be used or configured to perform functions presented in the figures. In some instances, components of the devices and/or systems may be configured to perform the functions such that the components are actually configured and structured (with hardware and/or software) to enable such performance. In other examples, components of the devices and/or systems may be arranged to be adapted to, capable of, or suited for performing the functions, such as when operated in a specific manner.

By the term "substantially" or "about" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

The arrangements described herein are for purposes of example only. As such, those skilled in the art will appreciate that other arrangements and other elements (e.g., machines, interfaces, operations, orders, and groupings of operations, etc.) can be used instead, and some elements may be omitted altogether according to the desired results. Further, many of the elements that are described are functional entities that may be implemented as discrete or distributed components or in conjunction with other components, in any suitable combination and location.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims, along with the full scope of equivalents to which such claims are entitled. Also, the terminology used herein is for the purpose of describing particular implementations only, and is not intended to be limiting.

Embodiments of the present disclosure can thus relate to one of the enumerated example embodiments (EEEs) listed below.

EEE 1 is a system comprising: an electric motor; a mechanical device coupled to, and actuatable by, the electric motor; and an electronics module comprising: (i) a motor controller controlling the electric motor, and (ii) an actuator board that is electrically coupled to the motor controller, wherein the motor controller is removable and replaceable, wherein the actuator board remains attached to the system when the motor controller is removed and replaced, wherein the actuator board comprises (i) a memory storing one or more settings associated with the electric motor, or (ii) an identifier, wherein when a replacement motor controller is electrically connected to the actuator board, the replacement motor controller receives the one or more settings from the memory of the actuator board or receives the identifier, which allows the motor controller to retrieve the one or more settings.

EEE 2 is the system of EEE 1, wherein the electronics module comprises: a chassis interposed between a first cover and a second cover, wherein the motor controller is mounted to the first cover, and wherein the actuator board is attached to the chassis.

EEE 3 is the system of EEE 2, wherein the second cover is configured as an access cover that allows for access to the motor controller to make wire connections thereto.

EEE 4 is the system of any of EEEs 2-3, wherein the chassis comprises: a housing having a compartment therein, wherein the actuator board is mounted to the housing such that one or more components of the actuator board and wire connections thereto are stowed in the compartment of the housing.

EEE 5 is the system of any of EEEs 2-4, wherein the motor controller has one or more connectors, wherein the actuator board has one or more respective connectors, and wherein when the first cover having the motor controller mounted thereto is coupled to the chassis, the one or more connectors plug into the one or more respective connectors to electrically couple the motor controller to the actuator board.

EEE 6 is the system of EEE 5, wherein the one or more respective connectors of the actuator board are edge connectors.

EEE 7 is the system of any of EEEs 1-6, wherein the motor controller comprises a printed circuit board that is perpendicular to the actuator board when the motor controller is electrically coupled to the actuator board.

EEE 8 is the system of any of EEEs 1-7, wherein the actuator board has one or more jumpers, wherein a configuration of the one or more jumpers indicates the identifier, wherein when the replacement motor controller is electrically coupled to the actuator board, the replacement motor controller determines the identifier based on the configuration of the one or more jumpers.

EEE 9 is the system of any of EEEs 1-8, wherein the replacement motor controller has access to a database the associates a plurality of identifiers with corresponding sets of settings, wherein as the replacement motor controller receives the identifier, the replacement motor controller retrieves a corresponding set of settings for the electric motor from the database using the identifier.

EEE 10 is the system of any of EEEs 1-9, wherein a plurality of motor wires providing power to the electric motor are connected to the actuator board.

EEE 11 is the system of any of EEEs 1-10, wherein a plurality of sensor wires from a resolver indicating a rotary position of an output shaft of the electric motor and from one or more thermistors are connected to the actuator board.

EEE 12 is the system of any of EEEs 1-11, wherein the electronics module is mounted to the electric motor.

EEE 13 is a method comprising: removing a motor controller from an electronics module controlling an electric motor driving a mechanical device, wherein the electronics module includes an actuator board, wherein the actuator board remains attached to the electric motor when the motor controller is removed, and wherein the actuator board comprises (i) a memory storing one or more settings associated with the electric motor, or (ii) an identifier; replacing the motor controller with a replacement motor controller; and electrically coupling the replacement motor controller to the actuator board, thereby causing the replacement motor controller to receive the one or more settings from the memory of the actuator board or receive the identifier, which allows the motor controller to retrieve the one or more settings.

EEE 14 is the method of EEE 13, wherein the electronics module comprises a chassis interposed between a first cover and a second cover, wherein replacing the motor controller comprises: mounting the replacement motor controller to the first cover, wherein the actuator board is mounted to the chassis.

EEE 15 is the method of EEE 14, further comprising: removing the second cover from the chassis to access to the replacement motor controller mounted to the first cover; connecting one or more external wires provided to the electronics module to the replacement motor controller; and coupling the second cover to the chassis.

EEE 16 is the method of any of EEEs 14-15, wherein the motor controller has one or more connectors, wherein the actuator board has one or more respective connectors, and wherein electrically coupling the replacement motor controller to the actuator board comprises: mounting the first cover to the chassis, thereby plugging the one or more connectors of the motor controller into the one or more respective connectors of the actuator board.

EEE 17 is the method of any of EEEs 13-16, wherein the motor controller comprises a printed circuit board, and wherein the method further comprises: mounting the printed circuit board of the motor controller perpendicular to the actuator board.

EEE 18 is the method of any of EEEs 13-17, wherein the actuator board has one or more jumpers, wherein a configuration of the one or more jumpers indicates the identifier, wherein electrically coupling the replacement motor controller to the actuator board causes the replacement motor controller to determine the identifier based on the configuration of the one or more jumpers.

EEE 19 is the method of any of EEEs 13-18, wherein the replacement motor controller has access to a database the associates a plurality of identifiers with corresponding sets of settings, and wherein the method further comprises: retrieving, by the replacement motor controller, a corresponding set of settings for the electric motor from the database using the identifier.

EEE 20 is the method of any of EEEs 13-19, further comprising: connecting a plurality of motor wires providing power to the electric motor to the actuator board; and connecting a plurality of sensor wires from a resolver indicating a rotary position of an output shaft of the electric motor and from one or more thermistors to the actuator board.

What is claimed is:

1. A system comprising:
an electric motor;
a mechanical device coupled to, and actuatable by, the electric motor; and
an electronics module comprising: (i) a motor controller controlling the electric motor, and (ii) an actuator board that is electrically coupled to the motor controller, wherein the motor controller is removable and replaceable, wherein the actuator board remains attached to the system when the motor controller is removed and replaced, wherein the actuator board comprises (i) a memory storing one or more settings associated with the electric motor, or (ii) an identifier, wherein when a replacement motor controller is electrically connected to the actuator board, the replacement motor controller receives the one or more settings from the memory of the actuator board or receives the identifier, which allows the motor controller to retrieve the one or more settings.

2. The system of claim 1, wherein the electronics module comprises:
a chassis interposed between a first cover and a second cover, wherein the motor controller is mounted to the first cover, and wherein the actuator board is attached to the chassis.

3. The system of claim 2, wherein the second cover is configured as an access cover that allows for access to the motor controller to make wire connections thereto.

4. The system of claim 2, wherein the chassis comprises:
a housing having a compartment therein, wherein the actuator board is mounted to the housing such that one or more components of the actuator board and wire connections thereto are stowed in the compartment of the housing.

5. The system of claim 2, wherein the motor controller has one or more connectors, wherein the actuator board has one or more respective connectors, and wherein when the first cover having the motor controller mounted thereto is coupled to the chassis, the one or more connectors plug into the one or more respective connectors to electrically couple the motor controller to the actuator board.

6. The system of claim 5, wherein the one or more respective connectors of the actuator board are edge connectors.

7. The system of claim 1, wherein the motor controller comprises a printed circuit board that is perpendicular to the actuator board when the motor controller is electrically coupled to the actuator board.

8. The system of claim 1, wherein the actuator board has one or more jumpers, wherein a configuration of the one or more jumpers indicates the identifier, wherein when the replacement motor controller is electrically coupled to the actuator board, the replacement motor controller determines the identifier based on the configuration of the one or more jumpers.

9. The system of claim 1, wherein the replacement motor controller has access to a database the associates a plurality of identifiers with corresponding sets of settings, wherein as the replacement motor controller receives the identifier, the replacement motor controller retrieves a corresponding set of settings for the electric motor from the database using the identifier.

10. The system of claim 1, wherein a plurality of motor wires providing power to the electric motor are connected to the actuator board.

11. The system of claim 1, wherein a plurality of sensor wires from a resolver indicating a rotary position of an output shaft of the electric motor and from one or more thermistors are connected to the actuator board.

12. The system of claim 1, wherein the electronics module is mounted to the electric motor.

13. A method comprising:
removing a motor controller from an electronics module controlling an electric motor driving a mechanical device, wherein the electronics module includes an actuator board, wherein the actuator board remains attached to the electric motor when the motor controller is removed, and wherein the actuator board comprises (i) a memory storing one or more settings associated with the electric motor, or (ii) an identifier;
replacing the motor controller with a replacement motor controller; and
electrically coupling the replacement motor controller to the actuator board, thereby causing the replacement motor controller to receive the one or more settings from the memory of the actuator board or receive the identifier, which allows the motor controller to retrieve the one or more settings.

14. The method of claim 13, wherein the electronics module comprises a chassis interposed between a first cover and a second cover, wherein replacing the motor controller comprises:
mounting the replacement motor controller to the first cover, wherein the actuator board is mounted to the chassis.

15. The method of claim 14, further comprising:
removing the second cover from the chassis to access to the replacement motor controller mounted to the first cover;

connecting one or more external wires provided to the electronics module to the replacement motor controller; and coupling the second cover to the chassis.

16. The method of claim 14, wherein the motor controller has one or more connectors, wherein the actuator board has one or more respective connectors, and wherein electrically coupling the replacement motor controller to the actuator board comprises:

mounting the first cover to the chassis, thereby plugging the one or more connectors of the motor controller into the one or more respective connectors of the actuator board.

17. The method of claim 13, wherein the motor controller comprises a printed circuit board, and wherein the method further comprises:

mounting the printed circuit board of the motor controller perpendicular to the actuator board.

18. The method of claim 13, wherein the actuator board has one or more jumpers, wherein a configuration of the one or more jumpers indicates the identifier, wherein electrically coupling the replacement motor controller to the actuator board causes the replacement motor controller to determine the identifier based on the configuration of the one or more jumpers.

19. The method of claim 13, wherein the replacement motor controller has access to a database the associates a plurality of identifiers with corresponding sets of settings, and wherein the method further comprises:

retrieving, by the replacement motor controller, a corresponding set of settings for the electric motor from the database using the identifier.

20. The method of claim 13, further comprising:

connecting a plurality of motor wires providing power to the electric motor to the actuator board; and connecting a plurality of sensor wires from a resolver indicating a rotary position of an output shaft of the electric motor and from one or more thermistors to the actuator board.

\* \* \* \* \*